United States Patent [19]
Takahashi et al.

[11] Patent Number: 5,883,385
[45] Date of Patent: Mar. 16, 1999

[54] MULTIBEAM SCANNING METHOD AND APPARATUS WITH POSITIONAL ADJUSTMENT FEATURES

[75] Inventors: Masaki Takahashi, Yokohama; Yoriyuki Ishibashi; Manabu Mikami, both of Kawasaki, all of Japan

[73] Assignee: Kabushiki Kaisha Toshiba, Kawasaki, Japan

[21] Appl. No.: 747,073

[22] Filed: Nov. 8, 1996

[51] Int. Cl.⁶ ................................. H01J 3/14; H04N 1/04
[52] U.S. Cl. ............................................ 250/235; 358/481
[58] Field of Search .................................. 250/234, 235, 250/236; 358/474, 483, 488, 496, 481

[56] References Cited

U.S. PATENT DOCUMENTS

| | | | |
|---|---|---|---|
| 4,600,837 | 7/1986 | Distefano et al. | 250/235 |
| 5,006,705 | 4/1991 | Saito et al. . | |
| 5,018,808 | 5/1991 | Meyers et al. | 250/235 |
| 5,245,181 | 9/1993 | Cho . | |
| 5,331,147 | 7/1994 | Mizuno et al. | 250/235 |

FOREIGN PATENT DOCUMENTS

| | | |
|---|---|---|
| 0 323 850 | 7/1989 | European Pat. Off. . |
| 0 406 844 | 1/1991 | European Pat. Off. . |
| 0 412 038 | 2/1991 | European Pat. Off. . |
| 1-210972 | 8/1989 | Japan . |
| 1-43294 | 9/1989 | Japan . |
| 6-94215 | 11/1994 | Japan . |
| WO 95/08160 | 3/1995 | WIPO . |

*Primary Examiner*—Edward P. Westin
*Assistant Examiner*—Kevin Pyo
*Attorney, Agent, or Firm*—Oblon, Spivak, McClelland, Maier & Neustadt, P.C.

[57] ABSTRACT

A multibeam scanning apparatus includes a polygon mirror provided between laser beam generation sources and a photosensitive drum of a target, for deflecting laser beams emitted from the laser beam generation sources to scan the photosensitive drum, galvanomirrors provided between the polygon mirror and each of the laser beam generation sources, for allowing a radiating position of each of the laser beams to move on the photosensitive drum, a sensor located in a downstream position of the polygon mirror and optically in conjugation with the photosensitive drum, for sensing the radiating positions of the laser beams on the photosensitive drum, and controller for controlling the galvanomirrors in order to set the radiating positions of the laser beams on the photosensitive drum in response to a signal output from the sensor.

21 Claims, 10 Drawing Sheets

MULTIBEAM SCANNING METHOD AND APPARATUS WITH POSITIONAL ADJUSTMENT FEATURES

BACKGROUND OF THE INVENTION

1. Field of the Invention

The present invention relates to a multibeam scanning method and apparatus suitable to be applied to a laser printer, a digital copying machine whose recording section is equipped with a laser printer, and the like.

2. Description of the Related Art

As is well-known, in a laser printer or a digital copying machine whose recording section has a laser printer, a laser beam emitted from a single laser source is deflected by a rotating polygon mirror serving as a scanning element, and the surface of a photosensitive drum is scanned with the deflected laser beam to thereby record an image.

To gather recording speed in such a machine, the transfer speed of image information for modulating a laser beam should be increased, as should be the rotational speed of a polygon mirror. Since, however, there is naturally a limit to an increase in these speeds, there is a limit to an improvement in recording speed using a single laser beam, too.

An image recording technique of overcoming the above drawback is proposed in, for example, Jpn. Pat. Appln. KOKOKU Publication No. 1-43294. In this technique, the surface of a photosensitive drum is scanned with a plurality of laser beams at once, and these laser beams are modulated by different items of image information thereby to record an image. Since a plurality of lines of the image are formed simultaneously using a plurality of laser beams, the recording speed can be increased by the number of laser beams without changing the speed of the rotating polygon mirror or the image information transfer rate.

The above-described machine is called a multibeam scanning apparatus. As a laser beam generation source of the apparatus for generating a plurality of laser beams, there are known an array of laser diodes arranged in one chip, as disclosed in Jpn. Pat. Appln. KOKOKU Publication No. 1-43294 and a plurality of laser diodes which are separate from each other, as disclosed in Jpn. Pat. Appln. KOKOKU Publication No. 6-94215.

The former laser beam generation source has the advantages of both generating laser beams without varying a pitch therebetween and reducing in size. If, however, the power of generation is increased to achieve high-speed recording, there occurs a crosstalk wherein the laser beam emitted from one laser diode influences the laser beam emitted from another laser diode. The pitch between laser beams is structurally difficult to narrow and thus the beams have to be emitted with a pitch corresponding to several lines of recording. It is thus necessary that a laser beam should jump over an image portion formed by a previously-emitted laser beam in which direction the photosensitive drum moves. The former therefore has a drawback of complicating an image forming process.

The latter laser beam generation source is capable of generating a laser beam at higher power and shortening the wavelength of the laser beam to record an image with high precision, without causing any crosstalk; on the other hand, it has drawbacks of making it difficult to set the pitch between laser beams to a desired value and causing the pitch to vary due to environmental temperature, heat generated from a laser diode itself, and the like, since the separate laser diodes have to be incorporated into an optical unit.

Since a laser scanning optical system is generally constituted as a magnifying optical system which magnifies an image several tens of times from each of laser beam generation sources to the surface of a photosensitive drum, the laser beam generation sources need to be positioned with precision of submicron. It is actually however impossible to secure such precision. Therefore, the multibeam scanning apparatus using the separate laser diodes includes a beam pitch correction control mechanism as described in Jpn. Pat. Appln. KOKOKU Publication No. 6-94215.

In the beam pitch correction control mechanism, before a plurality of laser beams are deflected by a rotating polygon mirror, a laser beam is split into beams by an optical means such as a beam splitter, and a pitch between the beams is detected, thus controlling the positions of the beams. In this case, however, there often occurs a shift in beam pitch on the surface of the photosensitive drum. The multibeam scanning apparatus is so constituted that a laser beam is deflected by the rotating polygon mirror and radiated to the surface of the photosensitive drum through an optical element such as an f-θ lens. If the optical element is formed of an inexpensive plastic lens or the like, the positions of laser beams radiated to the surface of the photosensitive drum will be varied due to irregularities of the respective elements, environmental humidity, etc. Consequently, even though a pitch between laser beams is detected to control the positions of the beams before the beams are deflected by the polygon mirror, the pitch is difficult to set to a desired value on the surface of the photosensitive drum.

The above-described drawbacks are summarized as follows.

In a prior art multibeam scanning apparatus using a laser diode array as a laser beam generation source, a pitch between laser beams can be determined with high precision; however, it is difficult to increase in power for high-speed recording and shorten the wavelength of each laser beam for high resolution, and also necessary to perform an interlaced scanning accompanying a complicated control. On the other hand, in another prior art multibeam scanning apparatus using each of a plurality of separate laser diodes as a laser beam generation source, it is possible to increase in power for high-speed recording and shorten the wavelength of a laser beam for high resolution, but a beam pitch is very difficult to be set to a desired value and it is varied due to environmental temperature, humidity, and the like.

SUMMARY OF THE INVENTION

It is accordingly an object of the present invention to provide a multibeam scanning method and apparatus which is capable of taking the greatest possible advantage of using a plurality of separate laser beam generation sources and in which the positions of beams and the pitch between beams can always be set on a target with high precision, and the quality of images can be maintained for a long time even when it is applied to a printer or a copying machine.

According to a first aspect of the present invention, there is provided a multibeam scanning method in which a plurality of laser beams emitted from a plurality of separate laser beam generation sources are deflected by a deflection member to scan a target, comprising the steps of:

sensing a radiating position of each of the laser beams on the target in a downstream position of the deflection member and optically in conjugation with the target; and obtaining a deviation between the radiating position of each of the laser beams and a predetermined position based on a result of sensing, and controlling optical paths of the laser beams between the laser beam generation sources and the deflection member in order to set the radiating position in the predetermined position.

According to a second aspect of the present invention, there is provided a multibeam scanning method in which a plurality of laser beams emitted from a plurality of separate laser beam generation sources are deflected by a deflection member to scan a target, comprising the steps of:

sensing a radiating position of each of the laser beams on the target in a downstream position of the deflection member and optically in conjugation with the target; and obtaining a deviation between the radiating position of each of the laser beams and a predetermined position based on a result of sensing, and controlling positions of the laser beam generation sources in order to set the radiating position in the predetermined position.

According to a third aspect of the present invention, there is provided a multibeam scanning apparatus for scanning a target with a plurality of laser beams emitted from a plurality of separate laser beam generation sources, comprising:

first deflection means provided between the laser beam generation sources and the target, for deflecting the laser beams emitted from the laser beam generation sources to scan the target;

second deflection means provided between the first deflection means and each of the laser beam generation sources, for allowing a radiating position of each of the laser beams to move on the target;

sensor means located in a downstream position of the first deflection means and optically in conjugation with the target, for sensing the radiating position of each of the laser beams on the target; and control means for obtaining a deviation between the radiating position of each of the laser beams and a predetermined position based on a sensing result of the sensor means, and controlling the second deflection means in order to set the radiating position in the predetermined position.

The sensor means of the multibeam scanning apparatus can include a plurality of beam-receiving elements for sensing a first radiating position of each of the laser beams in a scanning direction and a second radiating position of each of the laser beams in a direction perpendicular to the scanning direction. In this case, it is desirable that the multibeam scanning apparatus further comprises a means for switching the laser beam generation sources every scan of the laser beams so as to sense the second radiating positions.

The sensor means can include a beam-receiving element, located upstream in the scanning direction of each of the laser beams, for sensing a reference position indicative of start of scanning and beam-receiving elements, located downstream in the scanning direction, for sensing the second radiating position.

The multibeam scanning apparatus can further comprise either a reflection mirror provided in an upstream position of scanning of the target, for guiding the laser beams from the first deflection means to a beam-receiving face of the sensor means, or a reflection mirror provided in a downstream position of scanning of the target, for guiding the laser beams from the first deflection means to a beam-receiving face of the sensor means.

The multibeam scanning apparatus can further comprise two reflection mirrors provided in upstream and downstream positions of scanning of the target, respectively, for guiding the laser beams from the first deflection means to a beam-receiving face of the sensor means. In this case, it is desirable that the control means includes means for averaging the first and second radiating positions sensed by the sensor means.

It is desirable that the multibeam scanning apparatus further comprises a half mirror provided between the first deflection means and the target, for separating a laser beam from the laser beams sent out from the first deflection means and guiding the laser beam to a beam-receiving face of the sensor means.

The second deflection means can include a galvanomirror.

According to a fourth aspect of the present invention, there is provided a multibeam scanning apparatus for scanning a target with a plurality of laser beams emitted from a plurality of separate laser beam generation sources, characterized by comprising:

deflection means provided between the laser beam generation sources and the target, for deflecting the laser beams emitted from the laser beam generation sources to scan the target;

laser beam generation source driving means for moving positions of the laser beam generation sources to allow a radiating position of each of the laser beams to move on the target;

sensor means located in a downstream position of the deflection means and optically in conjugation with the target, for sensing the radiating position of each of the laser beams on the target; and control means for obtaining a deviation between the radiating position of each of the laser beams and a predetermined position based on a sensing result of the sensor means, and controlling the laser beam generation source driving means in order to set the radiating position in the predetermined position.

In the multibeam scanning methods and apparatuses described above, the plurality of separate laser beam generation sources are employed to generate a plurality of laser beams, so that the power of the laser beams can be heightened and the wavelength thereof can be shortened without causing any crosstalk. The present invention contributes to improvements in recording speed and recording resolution when it is applied to a laser printer or a copying machine. The laser beams generated from the laser beam generation sources are deflected, the radiating positions of the laser beams on a target are sensed in a downstream position of the deflection means and optically in conjugation with the target, and the positions of the laser beams are controlled based on the result of the sensing so as to set each of the radiating positions in a predetermined position. Therefore, the positions of the laser beams on the target and the pitch therebetween can always be set to predetermined values even though the sources are not mounted sufficiently precisely, even though the mounting precision of the sources is deteriorated due to heat generated therefrom, or even though the characteristics of the optical element provided halfway through the optical path are varied with environmental temperature or humidity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described with reference to the accompanying drawings.

(First Embodiment)

Figure 1:
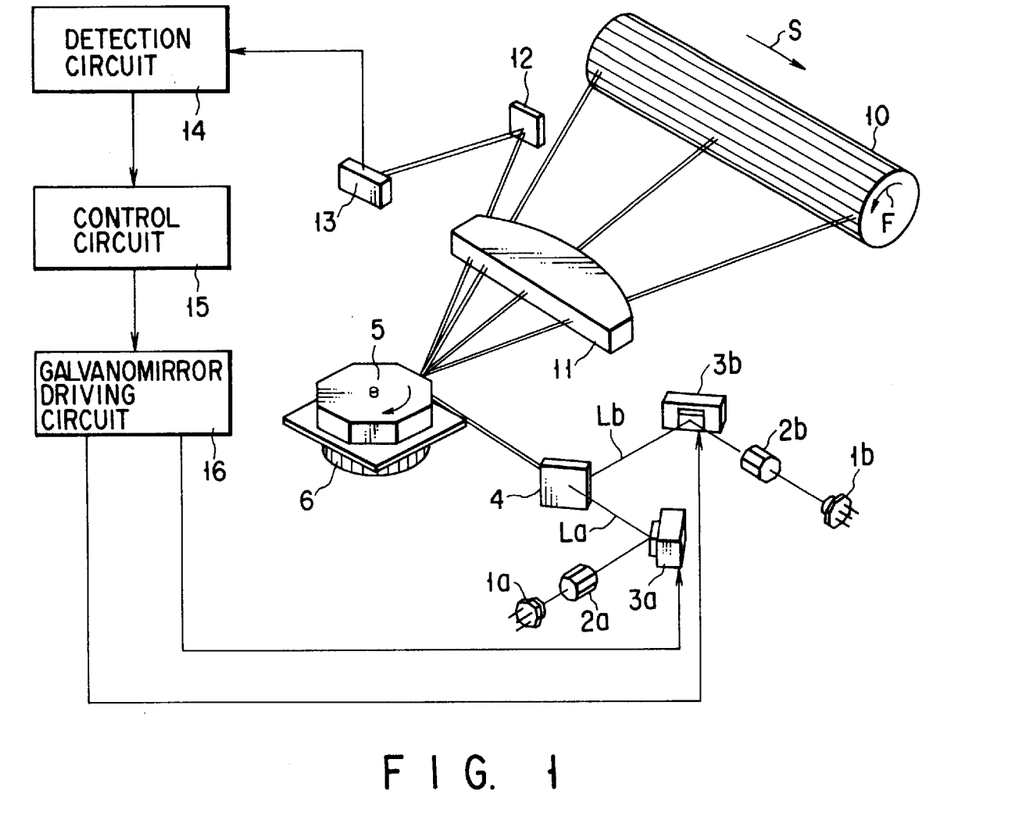
FIG. 1 is a schematic view of the constitution of a laser printer incorporating a multibeam scanning apparatus according to a first embodiment of the present invention.

FIG. 1 shows the principal part of a laser printer for recording an image using two laser beams to which a multibeam scanning apparatus according to the first embodiment of the present invention is applied.

In FIG. 1, reference numerals 1a and 1b denote separate laser beam generation sources each formed of a semiconductor laser diode. These sources 1a and 1b are so arranged that their optical axes cross each other. The laser beams generated from the sources 1a and 1b are modulated and blinked in accordance with image information sent from a known image information supply system (not shown). The diffusion light beams emitted from the sources 1a and 1b are converted into parallel light beams by lenses 2a and 2b and then deflected by galvanomirrors 3a and 3b whose reflection angles are each controlled in response to an electrical signal.

The laser beams La and Lb deflected by the galvanomirrors 3a and 3b, respectively, are synthesized by a half mirror 4 such that a pitch therebetween is 0.042 mm according to the resolution of the laser printer on the surface of a photosensitive drum 10 which will be described later.

The synthesized laser beams La and Lb are deflected by a polygon mirror 5 of an octagon rotated at high speed, and simultaneously scan the surface of the photosensitive drum 10 serving as a target. The polygon mirror 5 is rotated by a polygon motor 6. The laser beams La and Lb deflected by the polygon mirror 5 pass through an f-θ lens 11 and scan the surface of the photosensitive drum 10 in the main scanning direction (indicated by arrow S in FIG. 1) in order to form an image on the surface of the drum 10. The drum 10 is rotated by a drive system (not shown) in the sub-scanning direction (indicated by arrow F in FIG. 1).

A reflection mirror 12 is provided within a scanning range of the laser beams La and Lb and on the scanning start side not included in an image forming region of the drum 10. The laser beams La and Lb are guided to a sensor 13 through the reflection mirror 12 to sense the positions of these laser beams in the main scanning direction and sub-scanning directions. The sensor 13 is located optically in conjugation with the surface of the photosensitive drum 10.

The recording of images on the surface of the photosensitive drum 10 is performed in synchronization with a position sensing signal (reference signal indicative of the start of scanning) output in the scanning direction from the sensor 13 upon reception of the laser beams La and Lb. In other words, the modulation of laser beams La and Lb is started in accordance with image video information after a lapse of a predetermined period of time after a main scanning direction sensing signal is output from the sensor 13. Thus, the images on the surface of the photosensitive drum are arranged exactly in a direction perpendicular to the scanning direction of laser beams La and Lb (sub-scanning direction). A control circuit for modulating the laser beams in accordance with image video data to record an image in synchronization with the position sensing signal output from the sensor 13, is omitted from FIG. 1.

The pitch between the two laser beams La and Lb in the sub-scanning direction has to correspond to the resolution of the printer. Since, in this embodiment, the resolution is set to 600 dpi, the beam pitch should be 0.042 mm. To prevent the recorded images from decreasing in quality, an error of the beam pitch is required to be smaller than several microns. However, the laser beams are magnified 20 times to 60 times from the laser beam generation sources 1a and 1b to the photosensitive drum 10, and the sources 1a and 1b are separately attached to the housing; thus, the precision of the beam pitch cannot be maintained even by simply adjusting the pitch of the laser beams. Furthermore, the laser beam generation sources 1a and 1b generate heat during the operation, and the heat deforms the portions at which the sources are attached to the housing thereby to change the positions of the sources. It is thus impossible to maintain the pitch precision at all times.

In the first embodiment, the above problem can be resolved as follows. The sensor 13 is arranged optically in conjugation with the surface of the photosensitive drum 10, and both the sensor 13 and detection circuit 14 detect positions of images formed on the surface of the drum 10 by the two laser beams La and Lb (radiation positions) and obtains a deviation from a set value. Control signals for controlling galvanomirrors 3a and 3b arranged in their respective optical paths of the laser beams La and Lb are generated from a control circuit 15 based on a signal of the deviation, and fed back to a galvanomirror driving circuit 16 to control deflection angles of the galvanomirrors 3a and 3b, with the result that the image forming position of each of the laser beams La and Lb falls within a predetermined range.

Figure 2:
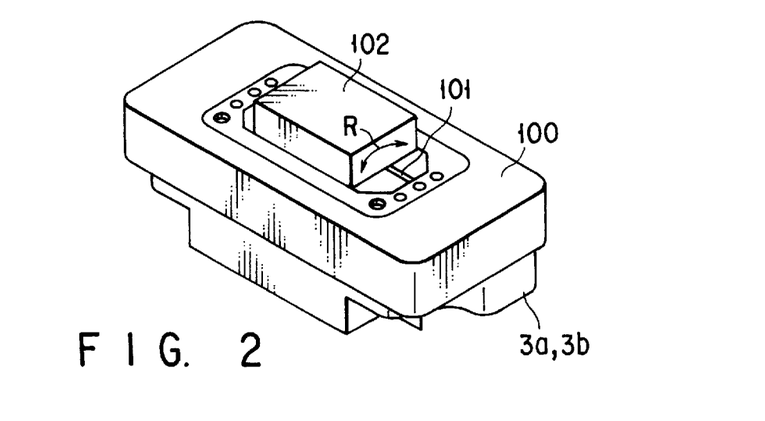
FIG. 2 is a perspective view of a galvanomirror incorporated into the multibeam scanning apparatus according to the first embodiment.

FIG. 2 illustrates the constitution of each of the galvanomirrors 3a and 3b. Referring to FIG. 2, a mirror 102 for deflecting a laser beam is supported by a galvanomirror body 100 and a torsional spring 101 such that it can be rotated in directions of arrows R. The mirror 102 is provided with a moving coil (not shown). By causing a current to flow through the coil, an electromagnetic force is generated between the coil and magnet mounted on the body 100 to rotate the mirror 102 in the directions of arrows R, and the deflection angle of the mirror 102 is maintained by holding the current flowing through the coil. In the first embodiment, the galvanomirrors 3a and 3b are so arranged that the image forming positions of the laser beams La and Lb are moved in the sub-scanning direction by rotating the mirrors 102 in the directions of arrows R.

Figure 3:
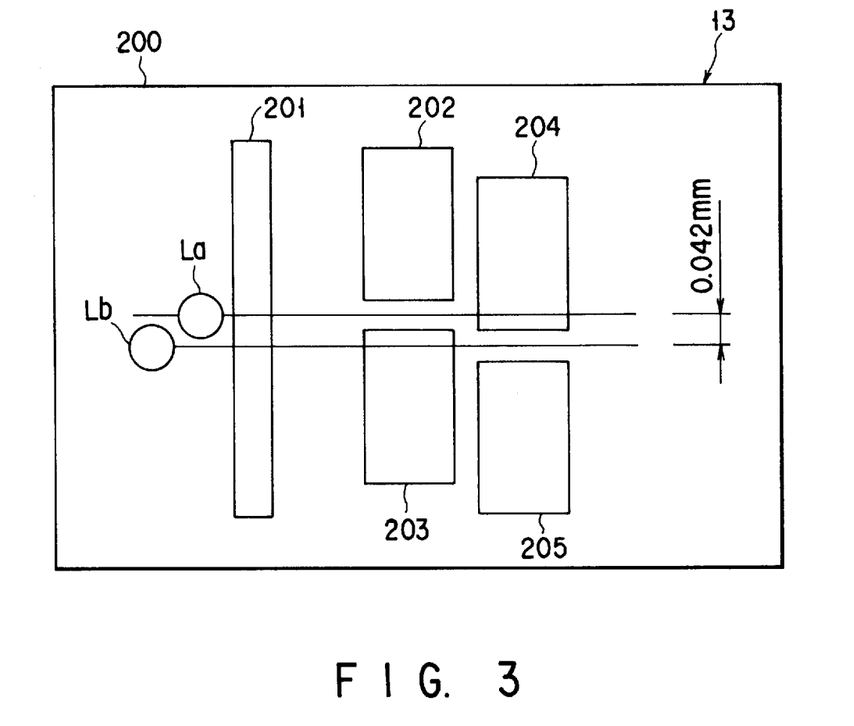
FIG. 3 is a schematic view of a beam-receiving section of a laser beam radiating position detecting sensor incorporated into the multibeam scanning apparatus according to the first embodiment.
Figure 4:
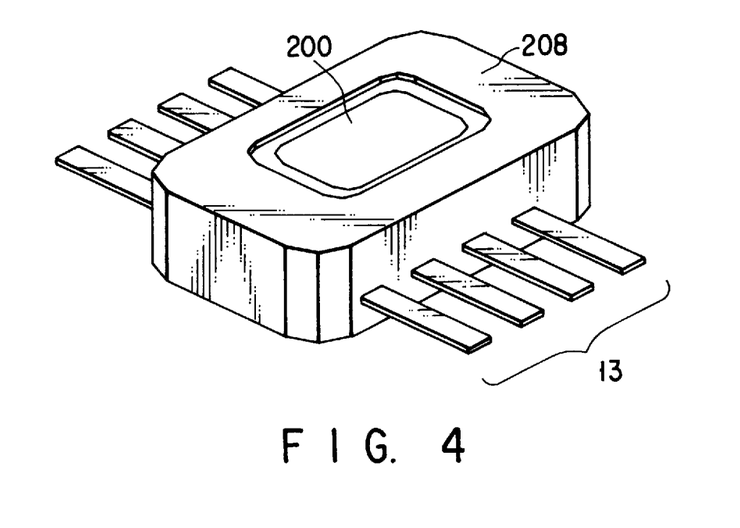
FIG. 4 is a view showing the outward appearance of the sensor incorporated into the multibeam scanning apparatus according to the first embodiment.

FIG. 3 schematically shows the shape of a beam-receiving face 200 of the sensor 13 for detecting the positions of the laser beams on the surface of the photosensitive drum 10. FIG. 4 illustrates the outward appearance of the sensor.

In the sensor 13, the beam-receiving face 200 is formed of a plurality of photodiodes and set in a multiple-pin package 208. The photodiodes have beam-receiving sections 201 to 205 and are formed on one chip. Upon receiving the laser beams while a bias is being applied between the cathode and anode, a current flows to an terminal of each of the beam-receiving sections and varies with an amount of luminous energy of the laser beams.

The beam-receiving sections 202 and 203 are intended to detect the image forming position of the laser beam La in the sub-scanning direction. These sections 202 and 203 are rectangular and opposed to each other with a gap of about 0.01 mm therebetween. When the laser beam La scans through both the beam-receiving sections 202 and 203, the amounts of currents detected from the sections 202 and 203 are measured, thereby detecting how far the laser beam La deviates from the gap center between the beam-receiving sections 202 and 203. A detection signal representing the deviation of the laser beam La from the gap center is fed back to the driving circuit 16 of the galvanomirror 3a, inserted in the optical path of the laser beam La through the control circuit 15, in order to control the laser beam La such that it always passes the gap center.

The other laser beam Lb is controlled in the same manner as described above. The beam-receiving sections 204 and 205 for detecting the image forming position of the laser beam Lb in the sub-scanning direction, are arranged opposite to each other with a gap of 0.01 mm therebetween. The gap center between the sections 204 and 205 is 0.042 mm away from that between the sections 202 and 203. Since the laser beam Lb is so controlled that it always passes the gap center between the sections 204 and 205, the pitch between the laser beams La and Lb is set equal to 0.042 mm corresponding to the printer resolution of 600 dpi. By controlling the laser beams, the positions thereof and the pitch therebetween are stably maintained.

In the first embodiment, the two laser beams La and Lb are sensed by switching their emissions every scan. If both the laser beams are emitted together, the laser beam Lb passes the opposed beam-receiving sections 202 and 203 for detecting the position of the laser beam La, at the same time when the laser beam La passes them; therefore, the position of the laser beam La cannot be detected. The same is true of the opposed beam-receiving sections 204 and 205. In the first embodiment, the laser beam La is emitted for the first scan and the laser beam Lb is emitted for the next scan to alternately detect the positions of the laser beams, and the level of a pulse-like position error signal obtained from the detection is held by a sample-and-hold circuit which will be described later.

The beam-receiving section 201 is used to detect timing at which each of the laser beams La and Lb passes the section 201 in the main scanning direction, and the modulation of the laser beams for recording an image is started in synchronization with a signal generated from the section 201. The signal also serves as a sampling timing signal for sampling and holding the level of the position sensing signal in the scanning direction of the laser beams La and Lb.

Figure 5:
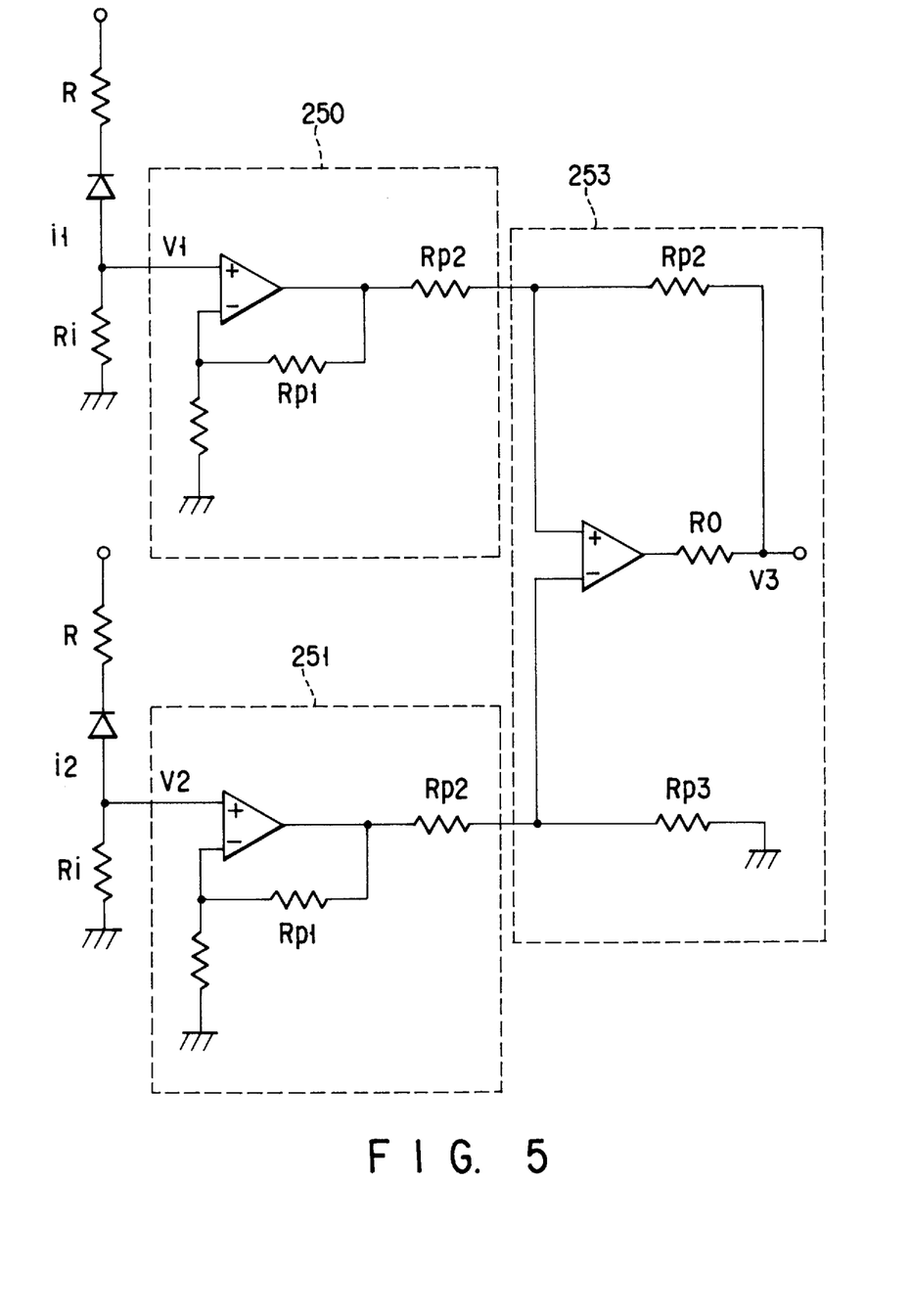
FIG. 5 is a circuit diagram of a differential circuit for generating a positional deflection signal in the multibeam scanning apparatus according to the first embodiment.

FIG. 5 shows an example of a differential circuit for obtaining a difference between the outputs of the opposed beam-receiving sections (202 and 203; 204 and 205) for detecting the positions of the laser beams La and Lb in the sub-scanning direction and issuing a signal indicative of a deviation of the beams from the gap center.

The currents i1 and i2 flowing through the photodiode of each beam-receiving section, are current-to-voltage converted into voltages V1 and V2 by resistors Ri. These voltages are supplied to a differential circuit 253 via preamplifier circuits 250 and 251, respectively, thereby to output a differential signal V3. The level of the signal V3 is defined as a sub-scanning position deviation signal of the laser beams. Since the sensor 13 is located optically in conjugation with the photosensitive drum 10 and arranged directly before an image area to which images are written by the laser beams La and Lb, a time period during which the laser beams are radiated to the sensor 13 is very short. The differential signal V3 is output as a pulse signal having a pulse width which depends upon both the laser scanning speed and the length of the beam-receiving sections. The image forming positions of the laser beams on the surface of the photosensitive drum are varied due to heat for a considerably long period of time relative to a laser scanning period.

Figure 6:
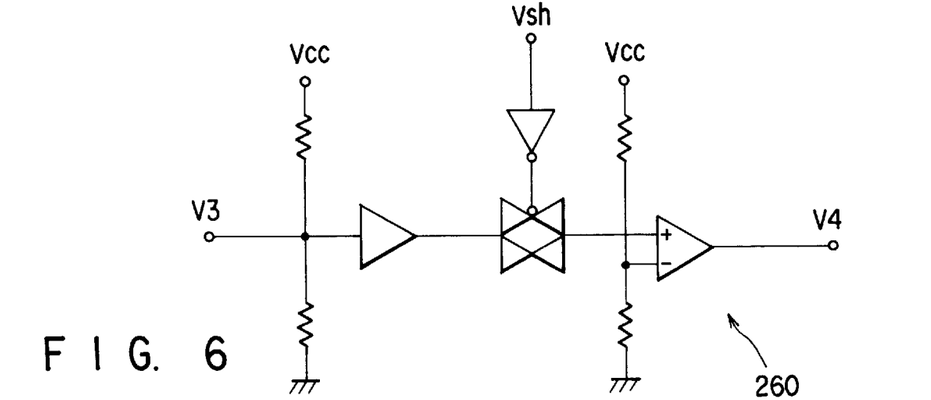
FIG. 6 is a circuit diagram of a sample-and-hold circuit for holding a level of a differential signal in the multibeam scanning apparatus according to the first embodiment.
Figure 7:
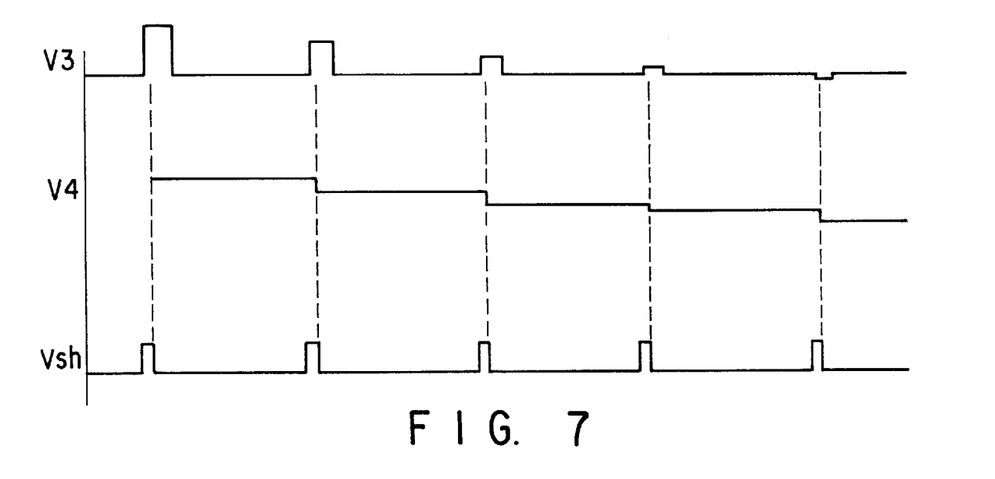
FIG. 7 is a timing chart for explaining a laser beam radiating position signal the level of which is held by the sample-and-hold circuit in the multibeam scanning apparatus according to the first embodiment.

In view of the frequency response characteristics of the galvanomirrors 3a and 3b, it is desirable that neither of the mirrors 3a and 3b move in an oscillating fashion for each scan, but it is undesirable that the differential signal V3 output as a pulse signal be a control signal of the galvanomirrors as it is. Thus, the level of the differential signal V3 output as a pulse signal is held for a one scanning period time by the sample-and-hold circuit 260, as shown in FIG. 6, to generate a differential signal V4. A pulse signal obtained by delaying a pulse signal, generated from the beam-receiving section 201, by a predetermined period of time such that the former pulse signal is generated when the laser beams pass the beam-receiving sections (202 and 203 or 204 and 205) for sensing a sub-scanning position of the sensor 13. The pulse signal is defined as a sampling timing signal Vsh for determining a sampling timing. The timing of each of differential signals V3 and V4 and sampling timing signal Vsh is shown in FIG. 7.

Figure 8:
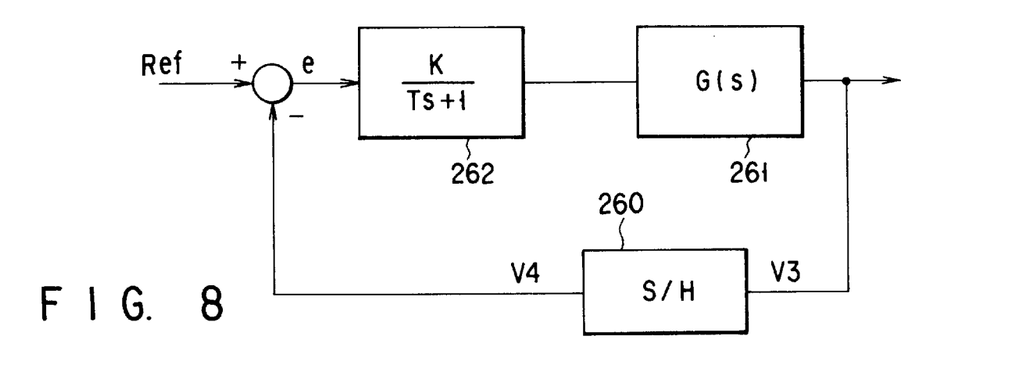
FIG. 8 is a block diagram of a control system for controlling a radiating position of a laser beam in the multibeam scanning apparatus according to the first embodiment.

FIG. 8 shows a control system including the above-described elements. Though only one control system for one laser beam is shown in this figure, the present invention actually comprises two control systems for controlling the positions of two laser beams. The control system includes a controlled device having the galvanomirrors 3a and 3b, the galvanomirror driving circuit 16, the sensor 13 and the differential circuit 253, and a control device 262 serving as a PID controller constituted of an analog circuit having the transfer function as shown. The control system also includes the aforementioned sample-and-hold circuit 260.

In virtue of the control system described above, the laser beams La and Lb are positioned such that a scan is performed in the beam-receiving gap center of the sensor 13, and the pitch between the two laser beams is kept to a predetermined value of 0.042 mm. The control system is constituted of analog circuits, but can be formed of a microcomputer system, an A/D converter, and a D/A converter. This microcomputer system may have a CPU, an interface and storage elements such as a ROM and a RAM. Moreover, the microcomputer system can be replaced with a digital signal processor (DSP).

As described above, according to the first embodiment of the present invention, the sensor 13, which is located optically in conjugation with the photosensitive drum 10, senses the radiating positions of laser beams La and Lb in the downstream position of the polygon mirror 5 for deflecting the laser beams La and Lb emitted from the laser beam generation sources 1a and 1b, and the deflection angles of galvanomirrors 3a and 3b provided on the optical paths of the laser beams La and Lb are controlled, with the result that the radiating position of each of the laser beams falls within a predetermined range.

Consequently, not only the advantage can be obtained by using the laser beam generation sources 1a and 1b independently of each other, but also the advantage of holding the laser beams in fixed positions on the photosensitive drum 10 can be obtained even though the sources 1a and 1b are not mounted sufficiently precisely, even though the mounting precision of the sources 1a and 1b is deteriorated due to heat generated therefrom, or even though the characteristics of the optical element provided halfway through the optical path are varied with environmental temperature or humidity. If, therefore, the apparatus according to the first embodiment is applied to a printer or a copying machine, an image of high quality can be recorded.

(Second Embodiment)

Figure 9:
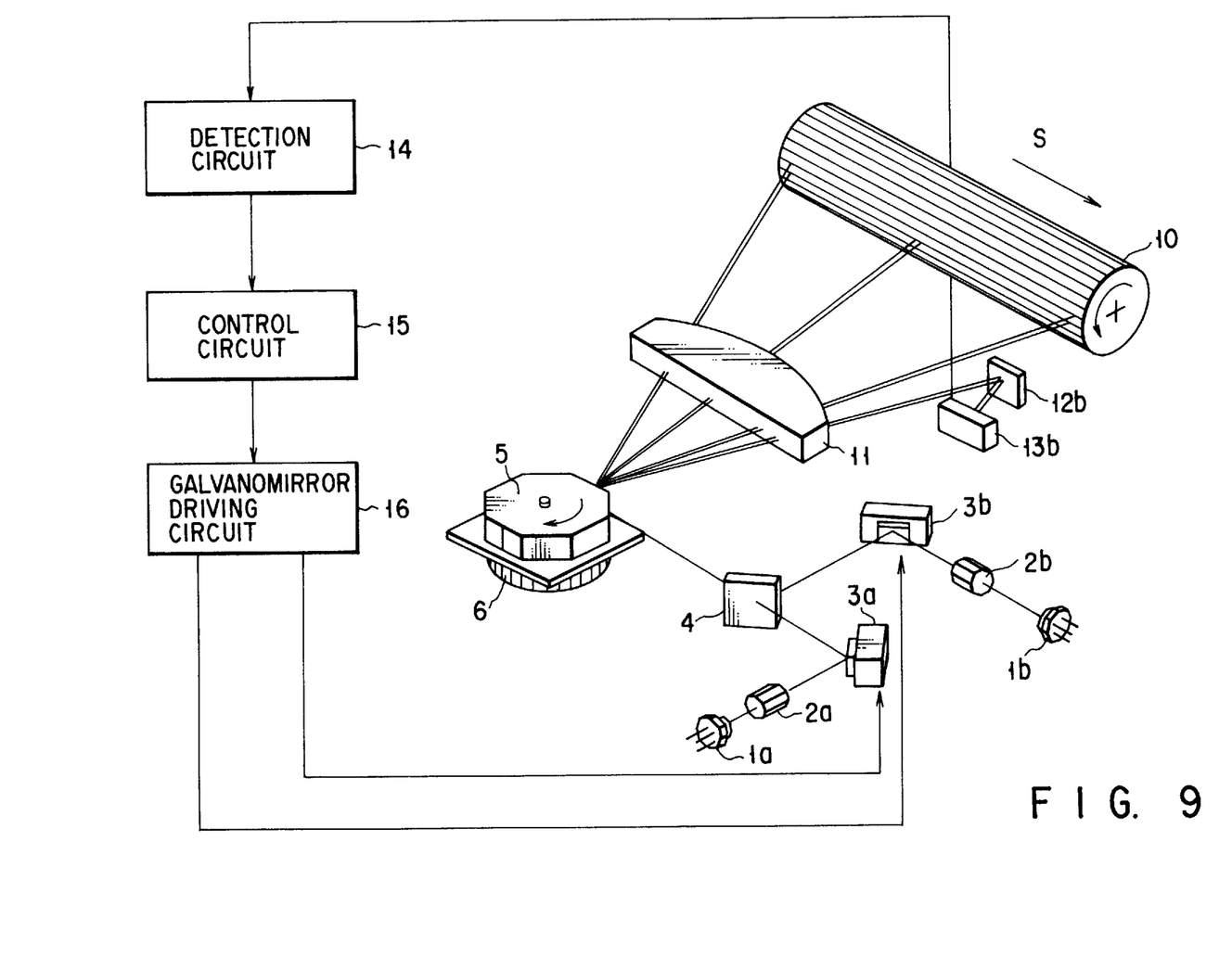
FIG. 9 is a schematic view of the constitution of a laser printer incorporating a multibeam scanning apparatus according to a second embodiment of the present invention.

FIG. 9 shows a laser printer to which a multibeam scanning apparatus according to the second embodiment of the present invention is applied. In FIG. 9, the same structural elements as those of the first embodiment are indicated by the same reference numerals, and their detailed descriptions are omitted. The feature of the second embodiment other than that of the first embodiment, will be then described. (The same is true of the third to fifth embodiments described later).

According to the second embodiment, a sensor 13b for sensing the position of a laser beam is located optically in conjugation with a photosensitive drum 10 and on the downstream side of scanning. A mirror 12b is provided in the optical path on the downstream side of scanning to guide the laser beam to the sensor 13b. In the first embodiment, the sensor 13 is located on the upstream side of scanning, whereas in the second embodiment, the sensor 13b is located on the downstream side of scanning.

The second embodiment is particularly effective when a space for arranging the sensor 13b is not sufficiently secured on the upstream side of scanning from the viewpoint of design, and can thus be increased in freedom of design.

(Third Embodiment)

Figure 10:
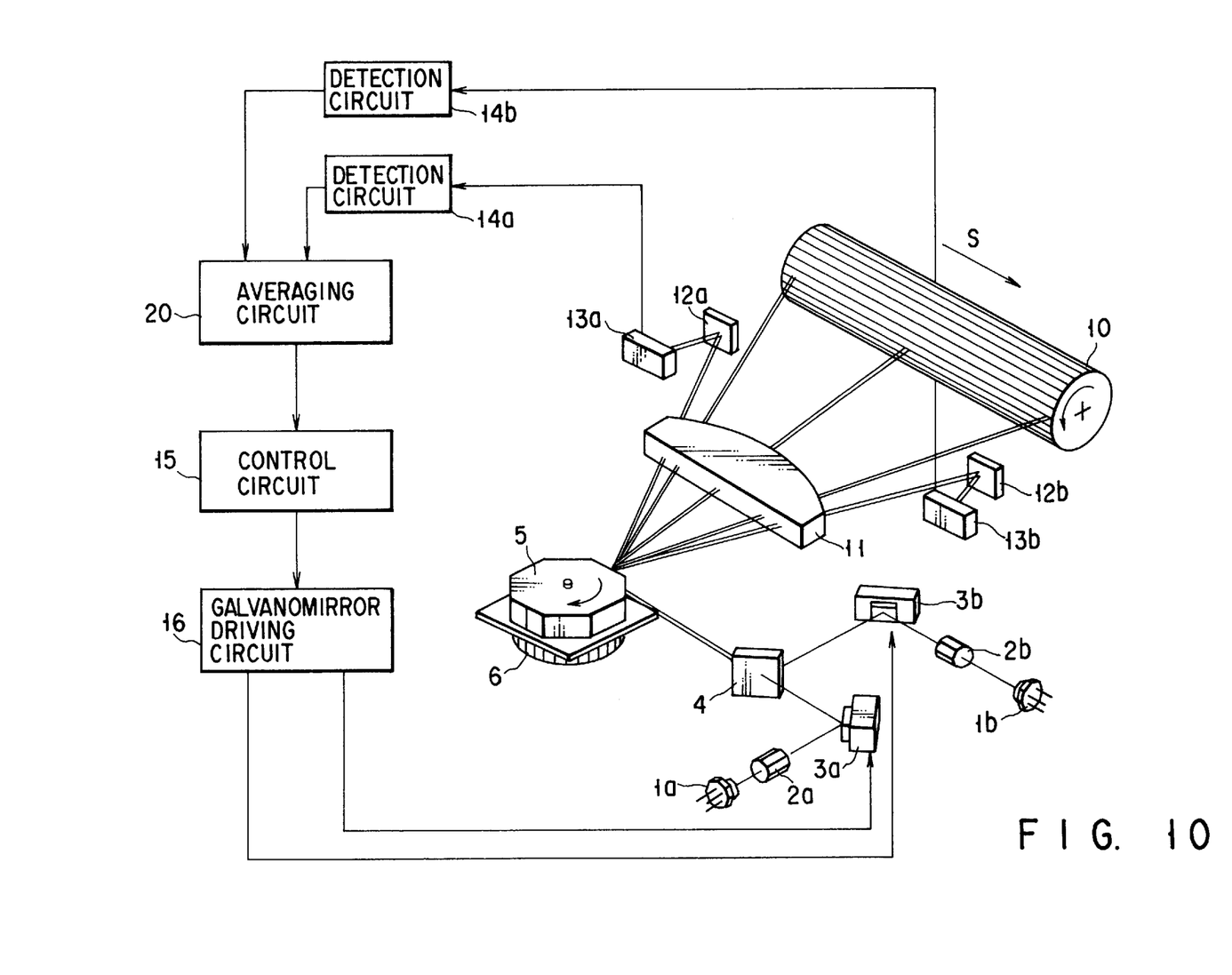
FIG. 10 is a schematic view of the constitution of a laser printer incorporating a multibeam scanning apparatus according to a third embodiment of the present invention.

A laser printer incorporating a multibeam scanning apparatus according to the third embodiment of the present invention, will now be described with reference to FIG. 10. In the third embodiment, sensors 13a and 13b for sensing the positions of laser beams are arranged on the upstream and downstream of scanning, respectively. The output signals of detection circuits 14a and 14b corresponding to the sensors 13a and 13b are averaged by an averaging circuit 20 and then fed back to a control circuit 15. The beam-receiving faces of the sensors 13a and 13b are set optically in conjugation with the surface of the drum 10.

Figure 11A:
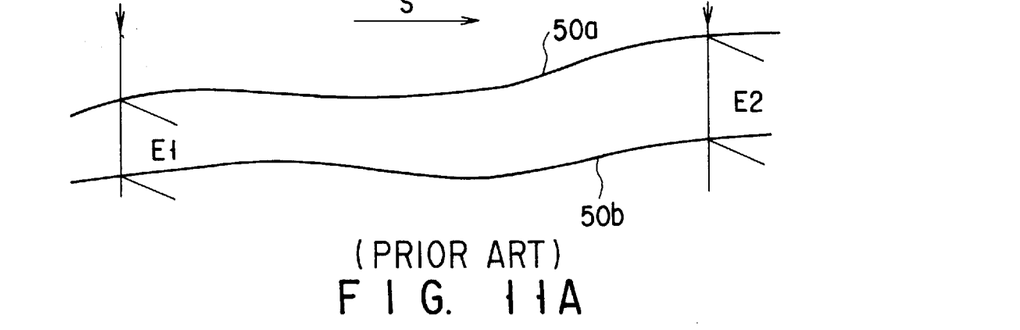
FIGS. 11A to 11C are views for explaining variations in pitch between two beams in a scanning direction in the multibeam scanning apparatus according to the third embodiment.
Figure 11B:
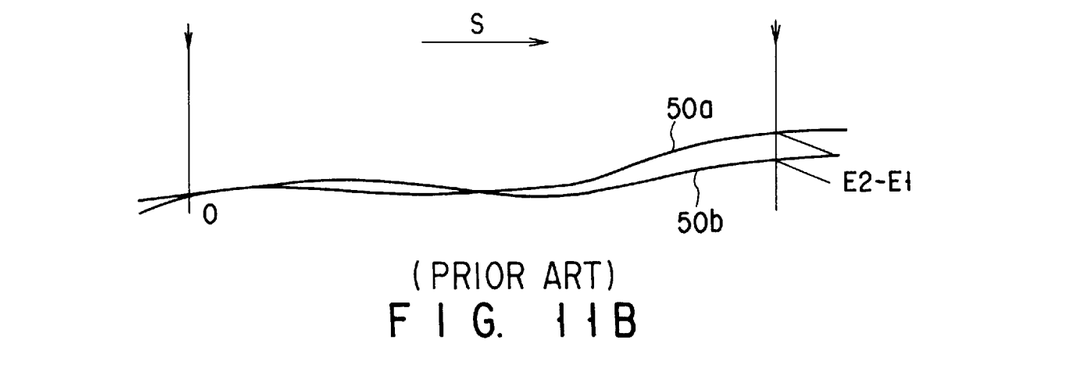
Figure 11C:
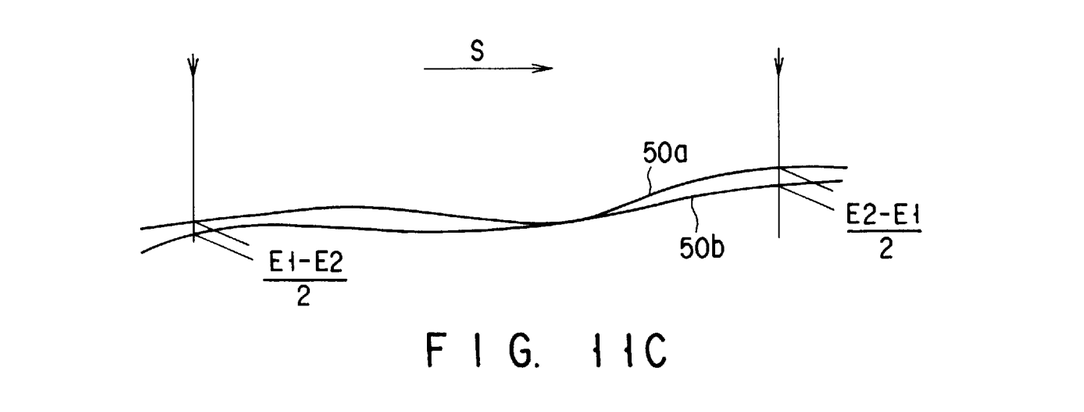

The third embodiment is effective when the image forming position of each of the laser beams is shifted in the scanning direction. More specifically, in the prior art multibeam scanning apparatus, the image forming position of a laser beam passing through a lens is slightly shifted due to precision in manufacture of the lens or variations in environment and, as shown in FIG. 11A, scanning lines 50a and 50b are not straight ones but curves having a distortion, so that a pitch between the two laser beams may vary with the scanning direction. If, in this case, the scanning position is sensed at one point on either the upstream or downstream side, as in the foregoing first and second embodiments, and corrected, then the beam pitch becomes normal in positions where the sensors are located. However, as shown in FIG. 11B, it is difficult to maintain the beam pitch with high precision all over the scanning lines. In contrast, according to the third embodiment of the present invention, the scanning position of each laser beam is sensed at two points on both the upstream and downstream sides, and two values obtained by the sensing are averaged; therefore, as shown in FIG. 11C, an error in beam pitch can be reduced more than in the prior art where the scanning position is sensed at one point.

As one modification to the third embodiment, the multibeam scanning apparatus can be so constituted that the upstream sensor 13a senses both the amount of luminous energy for controlling the power of the laser beams and the timing of the scanning direction, and the downstream sensor 13b senses the positions of the laser beams.

(Fourth Embodiment)

Figure 12:
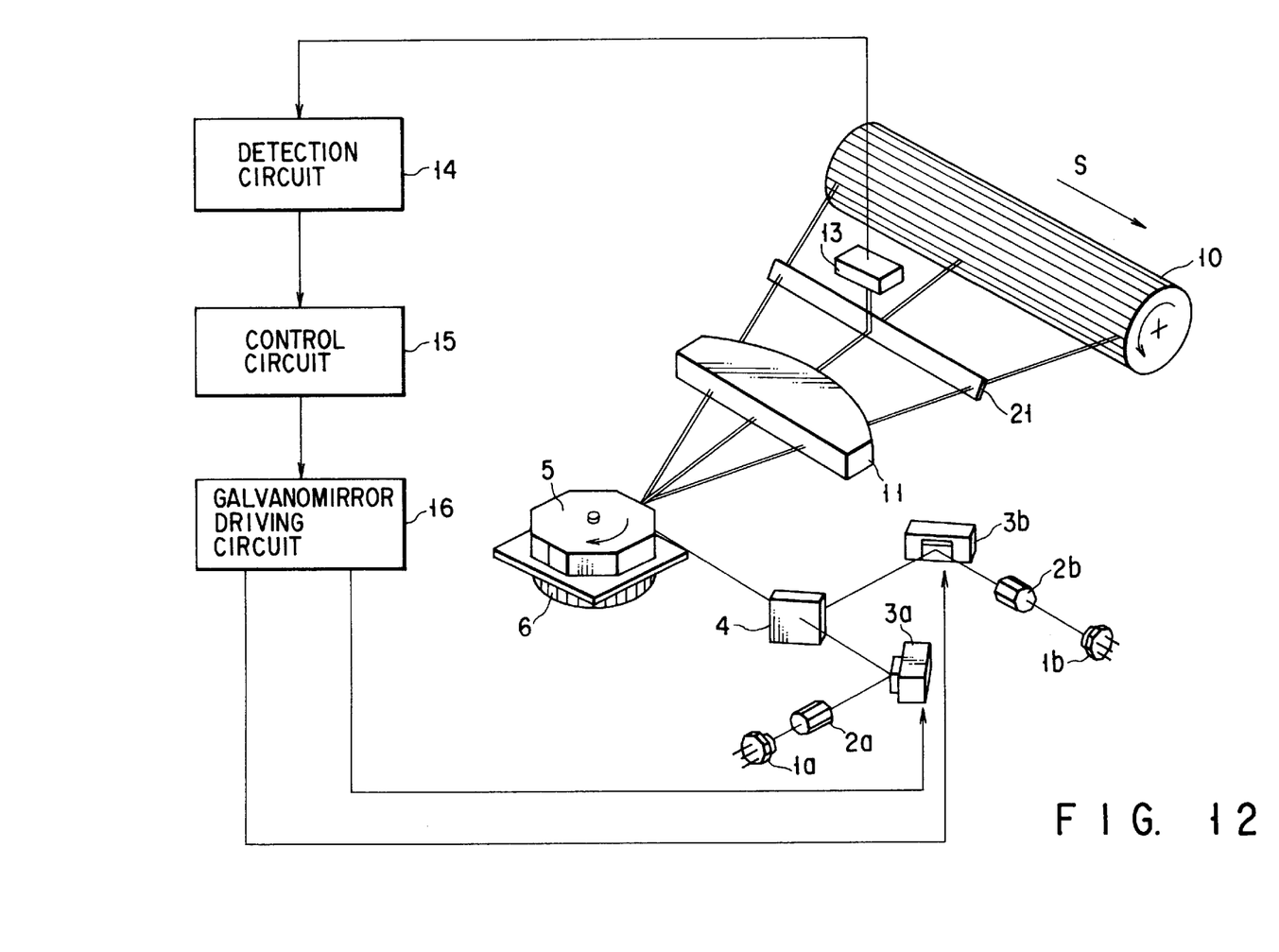
FIG. 12 is a schematic view of the constitution of a laser printer incorporating a multibeam scanning apparatus according to a fourth embodiment of the present invention.

A laser printer incorporating a multibeam scanning apparatus according to the fourth embodiment of the present invention, will now be described with reference to FIG. 12. In the fourth embodiment, one of laser beams for scanning a photosensitive drum 10 is separated from the others by a half mirror 21 and guided to the beam-receiving face of a sensor for sensing the position of the laser beam.

Consequently, the positions of the laser beams can be sensed in the middle of scanning, and the pitch between the beams can be maintained with high precision by the eye in the conspicuous central part of an image. In the fourth embodiment, the width of the half mirror 21 is the same as the whole width of the drum 10 scanned with the laser beams.

(Fifth Embodiment)

Figure 13:
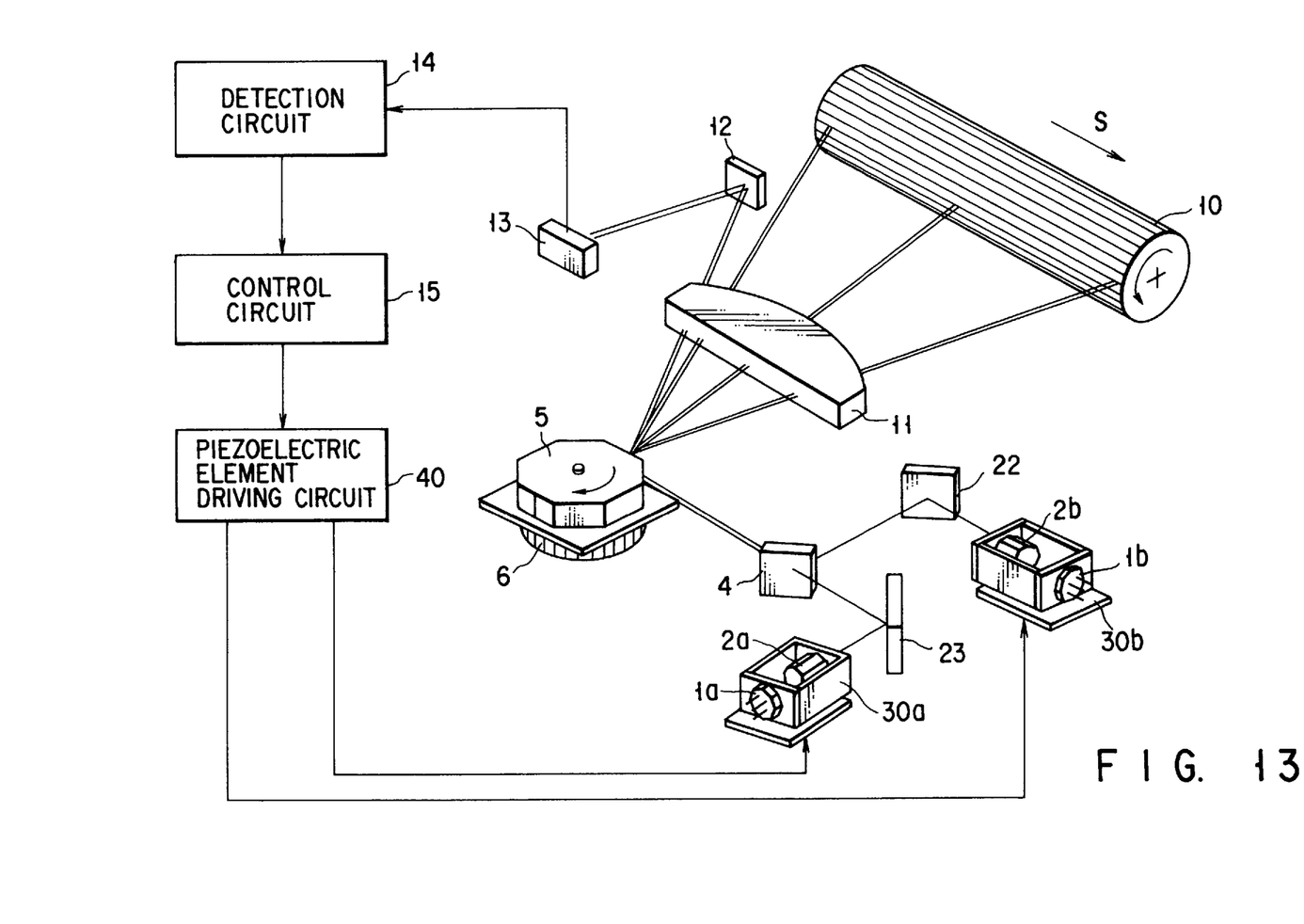
FIG. 13 is a schematic view of the constitution of a laser printer incorporating a multibeam scanning apparatus according to a fifth embodiment of the present invention.

A laser printer incorporating a multibeam scanning apparatus according to the fifth embodiment of the present invention, will now be described with reference to FIG. 13. In the fifth embodiment, semiconductor lasers 1a and 1b and collimator lenses 2a and 2b for converting laser beams emitted from the lasers into parallel laser beams, are arranged in laser beam generation source driving means (actuators) 30a and 30b, respectively. The laser beams output from the collimator lenses 2a and 2b are guided to a half mirror 4 through mirrors 22 and 23, respectively, and arranged on the surface of a photosensitive drum 10 with a predetermined pitch therebetween.

Like in the first embodiment, in order to correct a deviation in the pitch between the laser beams, a sensor 13 for sensing the positions of the laser beams is provided in conjugation with the photosensitive drum 10. Since the laser beam generation source driving means 30a and 30b are controlled in accordance with error information obtained from the sensor 13, the positions of the laser beams can fall within a predetermined range on the photosensitive drum 10.

Figure 14:
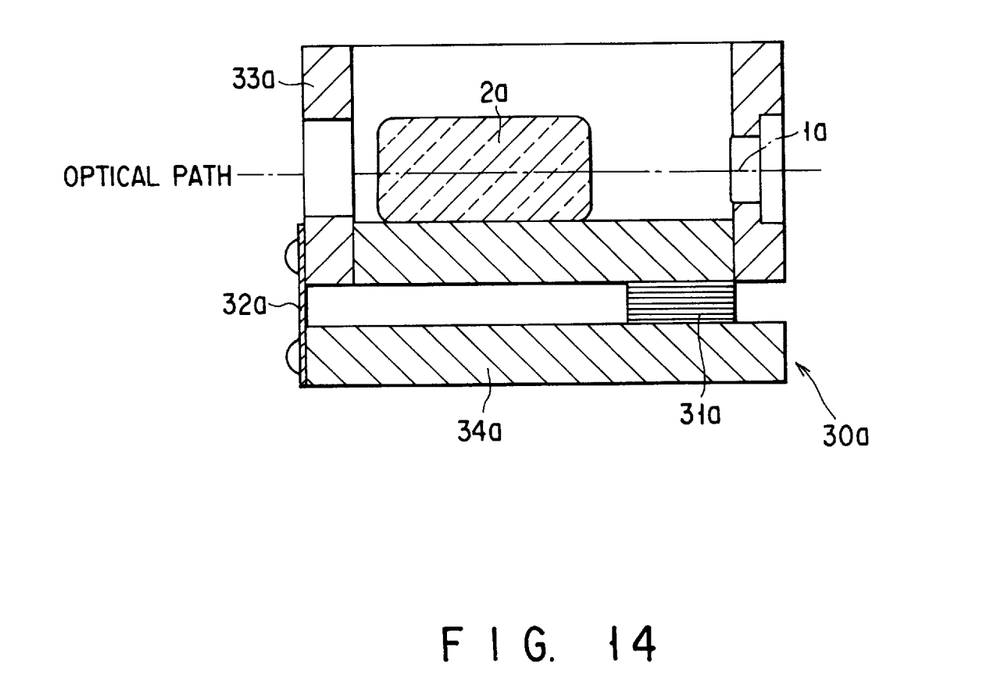
FIG. 14 is a cross-sectional view showing in detail a laser beam generation source driving means of the multibeam scanning apparatus according to the fifth embodiment.

The laser beam generation source driving means 30a and 30b will now be described in detail with reference to FIG. 14. FIG. 14 shows the constitution of only the driving means 30a, but the driving means 30b has the same constitution.

The laser beam generation source driving means 30a is manufactured as follows. First a semiconductor laser 1a is adhesively mounted on a holding member 33a, and a collimator lens 2a is also adhesively mounted thereon after its optical path is adjusted. The holding member 33a is then fixed to a base member 34a by both a plate spring 32a and a layered piezoelectric element 31a.

If a bias voltage is applied to the layered piezoelectric element 31a, it is deformed in its layer direction, with the result that the holding member 33a rotates around the plate spring 32a, the laser beam output from the collimator lens 2a varies in its optical axis, and the image formed on the surface of the photosensitive drum 10 changes in position. Thus, the position of the laser beam can fall within a predetermined range by driving the layered piezoelectric element 31a in response to a beam position error signal supplied from the sensor 13.

In the fifth embodiment, the semiconductor laser 1a and collimator lens 2a are driven simultaneously, but it is evident that the advantage of the fifth embodiment can be obtained even though only the semiconductor laser 1a is driven.

As described above, the present invention can resolve the problems caused when a multibeam scanning system is constituted of separate laser beam generation sources. More specifically, it can exactly resolve the problems of making it very difficult to set the beam pitch to a predetermined value and causing the beam pitch to be changed due to heat generated from the laser beam generation sources, environmental temperature and humidity, variations in characteristics of the optical elements inserted halfway in the optical paths, etc., thereby always maintaining a predetermined value of the beam pitch on a target.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiments, two laser beams are employed, but three or more laser beams can be used. A method of sensing the positions of the laser beams on a target is not limited to the above embodiments, either. For example, the sensor can be constituted so that when the gap center of each of two beam-receiving elements does not coincide with the beam pitch, the detection gains output from the beam-receiving elements are unbalanced and the scanning positions of laser beams are deviated from the gap center, thereby setting the beam pitch to a predetermined value. Furthermore, in FIG. 1, all the elements except the photosensitive drum 10, detection circuit 14, control circuit 15, and galvanomirror driving circuit 16, can be packaged in one housing. The present invention is not limited to a printer or a copying machine.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A multibeam scanning apparatus for scanning a target with a plurality of laser beams emitted from a plurality of separate laser beam generation sources, comprising:

a deflector provided between the plurality of laser beam generation sources and the target, configured to deflect the plurality of laser beams emitted from the plurality of laser beam generation sources so as to scan the target;

a laser beam generation source actuator configured to move positions of the plurality of laser beam generation sources so as to allow a radiating position of each of the plurality of laser beams to move on the target;

a sensor located in a downstream position of the deflector and optically in conjugation with the target, configured to sense the radiating position of each of the plurality of laser beams on the target; and a controller configured to obtain a deviation between the radiating position of each of the plurality of laser beams and a predetermined position based on a sensing result of the sensor, and controlling the laser beam generation source actuator in order to set the radiating position to the predetermined position.

2. A multibeam scanning method in which a plurality of laser beams emitted from a plurality of separate laser beam generation sources are deflected by a deflection member to scan a target, comprising the steps of:

sensing a radiating position of each of the plurality of laser beams on the target in a downstream position of the deflection member and optically in conjugation with the target; and obtaining a deviation between the radiating position of each of the plurality of laser beams and a predetermined position based on a result of the sensing step, and controlling positions of the plurality of laser beam generation sources in order to set the radiating position to the predetermined position.

3. A multibeam scanning apparatus for scanning a target with a plurality of laser beams emitted from a plurality of separate laser beam generation sources, comprising:

a first deflector provided between the plurality of laser beam generation sources and the target, for commonly deflecting the plurality of laser beams emitted from the plurality of laser beam generation sources to scan the target;

a second deflector provided between the first deflector and each of the plurality of laser beam generation sources, for allowing a radiating position of each of the plurality of laser beams to move on the target;

a lens provided between the first deflector and the target, for allowing the plurality of laser beams to commonly pass therethrough;

a sensor located at a downstream position of the lens and optically in conjugation with the target, for commonly sensing radiating positions of the plurality of laser beams on the target;

a reflection mirror provided between the lens and the sensor, for commonly guiding the plurality of laser beams from the lens to the sensor; and a controller for obtaining a deviation between the radiating position of each of the laser beams and a predetermined position based on a sensing result of the sensor, and controlling the second deflector in order to set the radiating position in the predetermined position.

4. The apparatus according to claim 3, wherein the sensor includes a plurality of beam-receiving elements for sensing a first radiating position of each of the plurality of laser beams in a scanning direction and a second radiating position of each of the plurality of laser beams in a direction perpendicular to the scanning direction.

5. The apparatus according to claim 4, wherein the laser beam generation sources are configured to switch the plurality of beams every scan so as to sense the second radiating position.

6. The apparatus according to claim 3, wherein the second deflector includes a galvanomirror.

7. The apparatus according to claim 3, wherein:
the reflection mirror is provided at an upstream position of scanning of the target.

8. The apparatus according to claim 3, wherein:
the reflection mirror is provided at a downstream position of scanning of the target.

9. The apparatus according to claim 3, wherein:
the two reflection mirrors are provided at upstream and downstream positions of scanning of the target, respectively.

10. The apparatus according to claim 9, wherein the controller includes a circuit for averaging the first and second radiating positions sensed by the sensor.

11. The apparatus according to claim 3, further comprising a half mirror provided between the first deflector and the target, for separating a laser beam from the plurality of laser beams sent out from the first deflector and guiding the laser beam to a beam-receiving face of the sensor.

12. A multibeam scanning method of scanning a target with a plurality of laser beams emitted from a plurality of separate laser beam generation sources, comprising the steps of:

deflecting the plurality of laser beams emitted from the plurality of separate laser beam generation sources by a deflection member to scan a target;

sensing the radiating position of each of the plurality of laser beams on the target in a downstream position of the deflection member and optically in conjugation with the target, in which a first beam-receiving element for sensing a reference position indicative of start of scanning is located upstream in the scanning direction of each of the plurality of laser beams, and a plurality of second beam-receiving elements for sensing a radiating position of each of the plurality of laser beams in a direction perpendicular to the scanning direction is located downstream in the scanning direction; and obtaining a deviation between the radiating position of each of the plurality of laser beams and a predetermined position based on a result of the sensing step, and controlling optical paths of the plurality of laser beams between the laser beam generation sources and the deflection member in order to set the radiating position to the predetermined position.

13. A multibeam scanning apparatus for scanning a target with a plurality of laser beams emitted from a plurality of separate laser beam generation sources, comprising:

a first deflector provided between the plurality of laser beam generation sources and the target, for deflecting the plurality of laser beams emitted from the plurality of laser beam generation sources to scan the target;

a second deflector provided between the first deflector and each of the plurality of laser beam generation sources, for allowing a radiating position of each of the plurality of laser beams to move on the target;

a sensor located at a downstream position of the first deflector and optically in conjugation with the target, for sensing the radiating position of each of the plurality of laser beams on the target, said sensor including a first beam-receiving element, located upstream in the scanning direction of each of the plurality of laser beams, for sensing a reference position indicative of start of scanning, and a plurality of second beam-receiving elements, located downstream in the scanning direction, for sensing a radiating position of each of the plurality of laser beams in a direction perpendicular to the scanning direction; and a controller for obtaining a deviation between the radiating position of each of the laser beams and a predetermined position based on a sensing result of the sensor, and controlling the second deflector in order to set the radiating position in the predetermined position.

14. A multibeam scanning method of scanning a target with a plurality of laser beams emitted from a plurality of separate laser beam generation sources, comprising the steps of:

commonly deflecting the plurality of laser beams emitted from the plurality of separate laser beam generation sources by a deflection member to scan a target;

allowing the plurality of laser beams after being deflected to commonly pass through a lens provided between the deflection member and the target;

commonly sensing radiating positions of the plurality of laser beams on the target by a sensor at a downstream position of the lens and optically in conjugation with the target;

commonly guiding the plurality of laser beams from the lens to the sensor by a reflection mirror provided between the lens and the sensor; and obtaining a deviation between the radiating position of each of the plurality of laser beams and a predetermined position based on a result of the sensing step, and controlling optical paths of the plurality of laser beams between the laser beam generation sources and the deflection member in order to set the radiating position to the predetermined position.

15. The apparatus according to claim 14, wherein:
the sensing step includes sensing a first radiating position of each of the plurality of laser beams in a scanning direction and a second radiating position of each of the plurality of laser beams in a direction perpendicular to the scanning direction.

16. The apparatus according to claim 15, further comprising the step of switching the plurality of laser beam generation sources every scan of the plurality of laser beams so as to sense the second radiating position.

17. The apparatus according to claim 14, wherein the reflection mirror is provided at an upstream position of scanning of the target.

18. The apparatus according to claim 14, wherein the reflection mirror is provided at a downstream position of scanning of the target.

19. The apparatus according to claim 14, wherein the two reflection mirrors are provided in upstream and downstream positions of scanning of the target, respectively.

20. The apparatus according to claim 19, wherein the controlling step includes averaging the first and second radiating positions sensed in said sensing step.

21. The apparatus according to claim 14, wherein a half mirror for separating a laser beam from the plurality of laser beams sent out from the deflection member and guiding the laser beam to a beam-receiving face of the sensor is provided between the deflection member and the target.

* * * * *

UNITED STATES PATENT AND TRADEMARK OFFICE
CERTIFICATE OF CORRECTION

PATENT NO. : 5,883,385
DATED : March 16, 1999
INVENTOR(S) : Masaki TAKAHASHI, et al.

It is certified that error appears in the above-identified patent and that said Letters Patent is hereby corrected as shown below:

On the title page, item [30], Foreign Application Priority Data is missing. It should be:

--[30] FOREIGN APPLICATION PRIORITY DATA

Nov. 09, 1995   [JP]   Japan  ................  7-291353--

Signed and Sealed this

Twenty-seventh Day of July, 1999

Attest:

Q. TODD DICKINSON

*Attesting Officer*    *Acting Commissioner of Patents and Trademarks*